US009540545B2

(12) United States Patent
Ramier et al.

(10) Patent No.: US 9,540,545 B2
(45) Date of Patent: Jan. 10, 2017

(54) PLASMA TREATMENT IN FABRICATING DIRECTIONAL DRILLING ASSEMBLIES

(75) Inventors: Julien Ramier, Bristol (GB); Hossein Akbari, Bristol (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 378 days.

(21) Appl. No.: 13/224,642

(22) Filed: Sep. 2, 2011

(65) Prior Publication Data

US 2013/0056443 A1 Mar. 7, 2013

(51) Int. Cl.

| | |
|---|---|
| ***C09J 5/02*** | (2006.01) |
| ***F04C 2/107*** | (2006.01) |
| ***F03C 2/08*** | (2006.01) |
| ***F04C 13/00*** | (2006.01) |
| *E21B 7/04* | (2006.01) |
| *C09K 13/00* | (2006.01) |
| *C08J 7/12* | (2006.01) |

(52) U.S. Cl.

CPC .. *C09J 5/02* (2013.01); *F03C 2/08* (2013.01); *F04C 2/1075* (2013.01); *F04C 13/008* (2013.01); *C08J 7/123* (2013.01); *C09K 13/00* (2013.01); *E21B 7/04* (2013.01); *F05C 2253/04* (2013.01); *F05C 2253/20* (2013.01)

(58) Field of Classification Search

CPC .............. C09J 5/02; F03C 2/08; F04C 2/1075; F04C 13/008; C08J 7/123; C09K 13/00; F05C 2253/04; F05C 2253/20

See application file for complete search history.

(56) References Cited

U.S. PATENT DOCUMENTS

| | | | | |
|---|---|---|---|---|
| 5,171,138 A * | 12/1992 | Forrest | E21B 4/02 418/153 |
| 5,171,139 A | 12/1992 | Underwood et al. | |
| 5,770,273 A | 6/1998 | Offer et al. | |
| 6,183,226 B1 * | 2/2001 | Wood | E21B 4/02 418/152 |
| 6,902,987 B1 * | 6/2005 | Tong et al. | 438/455 |
| 7,192,260 B2 * | 3/2007 | Lievestro | B23H 3/00 205/651 |

(Continued)

FOREIGN PATENT DOCUMENTS

| | | |
|---|---|---|
| CN | 101284711 A | 10/2008 |
| KR | 20040081231 A | 9/2004 |

(Continued)

OTHER PUBLICATIONS

First Office Action issued in related CN application 201210342401.6 on Nov. 24, 2016, 9 pages.

(Continued)

*Primary Examiner* — Anita Alanko

(74) *Attorney, Agent, or Firm* — Stephanie Chi

(57) ABSTRACT

Methods for improving adhesion or bonding between materials used in forming components of directional drilling assemblies, such as rotors and stators, are provided. A surface of a component may be treated, such as through cleaning, etching and/or activating a surface. The use of plasma treatment may enhance the adhesion between the surfaces and/or materials to be bonded, thereby reducing the degradation or mechanical failure of these materials in oilfield applications.

12 Claims, 1 Drawing Sheet

105
101
102
104
103

(56) References Cited

U.S. PATENT DOCUMENTS

| | | | | |
|---|---|---|---|---|
| 8,632,651 | B1 * | 1/2014 | Hicks | B29C 66/028 156/272.2 |
| 2008/0217304 | A1 | 9/2008 | Litzke | |
| 2008/0259125 | A1 * | 10/2008 | Haluzak et al. | 347/50 |
| 2008/0304992 | A1 * | 12/2008 | Hooper et al. | 418/48 |
| 2010/0155882 | A1 | 6/2010 | Castex | |
| 2010/0163169 | A1 | 7/2010 | Tong et al. | |
| 2010/0304146 | A1 * | 12/2010 | Krebs | C23C 16/4415 428/409 |
| 2011/0116960 | A1 * | 5/2011 | Akbari et al. | 418/48 |
| 2011/0189834 | A1 | 8/2011 | Castex et al. | |
| 2012/0134861 | A1 * | 5/2012 | Akbari | B29C 45/1459 418/48 |

FOREIGN PATENT DOCUMENTS

| | | | |
|---|---|---|---|
| RU | 2151850 | C1 * | 6/2000 |
| RU | 2292826 | C1 * | 2/2007 |
| SU | 962576 | A1 * | 9/1982 |
| WO | 01/44615 | A2 | 6/2001 |

OTHER PUBLICATIONS

Office Action issued in related RU application 2012137201 on Aug. 4, 2016, 7 pages.

* cited by examiner

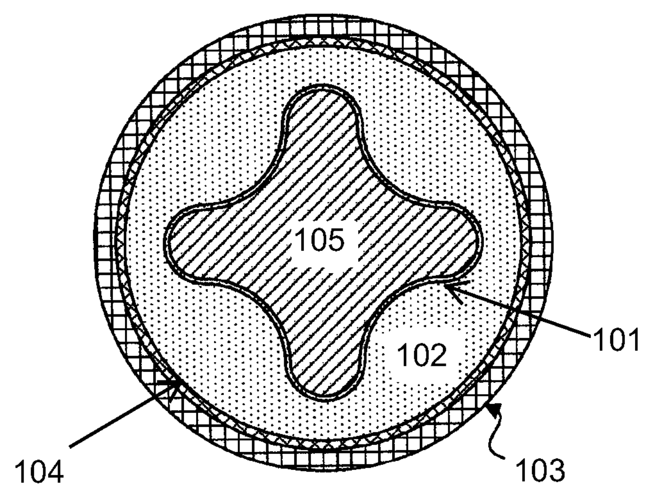
105
101
102
104
103

PLASMA TREATMENT IN FABRICATING DIRECTIONAL DRILLING ASSEMBLIES

BACKGROUND

Directional drilling involves the intentional deviation or steering of a drill bit to form a non-vertical wellbore that follows a desired path. The drill bit may be pointed in the direction that one wants to drill, which may be accomplished through use of a permanent bend near the drill bit in a downhole steerable mud motor, also referred to as a progressive cavity positive displacement pump. Such a mud motor connects the drillstring and the drill bit. The mud motor includes a power section comprising a rotor and stator and a transmission section. The pressure of drilling fluid, also known as mud, pumped through the drillstring from the surface, creates eccentric motion in the power section of the mud motor that is transmitted by the transmission section as concentric power to the drill bit. By pumping mud through the drillstring to the mud motor, the drill bit turns while the drillstring does not rotate, allowing the drill bit to drill in the direction that it points.

In a mud motor, a rotor generally turns within a stator to generate the power that spins the drill bit in a downhole direction. Mud motors may use different rotor and stator configurations to optimize performance for a directional drilling assembly. Non-metal materials, such as composite materials and/or resilient materials, such as elastomers, have come to be utilized in the fabrication of components in mud motors. For example, the stator of the mud motor may be formed of a composite material lined with a resilient material, such as an elastomer. However, severe operating and environmental conditions associated with oilfield applications where directional drilling assemblies may be utilized tend to degrade or induce mechanical failure of these materials forming components of mud motors due to insufficient adhesion or bonding between the materials.

SUMMARY

Embodiments of the present disclosure generally provide a method for adhering a first component of a directional drilling assembly to a second component. A surface of a first component may be plasma treated to form a plasma-treated surface. The plasma-treated surface may then be adhered to a surface of the second component. The surface of the second component also may be treated with plasma. Plasma may be atmospheric plasma or vacuum plasma. The plasma-treated surface also may be adhered to a surface of the second component with a bonding agent.

Plasma treating may include cleaning, etching, and activating the surface of the first component with plasma, or plasma treating may include one or more of these functions. In such treatment, cleaning may include treating the surface of the first component with plasma of a first intensity. Etching may include treating the surface of the first component with plasma of a second intensity. Activating may include treating the surface of the first component with plasma of a third intensity. The same plasma may be used at the first, second, and third intensities, or different plasmas may be used at the first, second, and third intensities.

Embodiments of the present disclosure also provide forming a directional drilling assembly by plasma treating a surface of a resilient layer to adhere to a polymer-based composite material. An internal surface of a stator tube also may be plasma treated to adhere to the polymer-based composite material. The resilient layer may include a fluoroelastomer, hydrogenated nitrile rubber, nitrile rubber, synthetic rubber, and/or natural rubber. The polymer-based composite material may be an epoxy, a metal-filled epoxy, an inorganic-filled epoxy, a polymer fiber-filled epoxy, a polyimide, a polyether ether ketone, a polyketone, a phenolic resin, and/or a polyphenylene sulfide.

Other embodiments of the present disclosure may improve the bonding properties of components of a mud motor by providing a mud motor having a stator formed from a resilient layer-lined cartridge, adhering a surface of the resilient layer-lined cartridge to a polymer composite, and treating the surface of the resilient layer-lined cartridge with plasma prior to adhering the surface of the resilient layer-lined cartridge to the polymer composite. An internal surface of a stator tube may be treated with plasma to form a plasma-treated surface. The plasma-treated surface may then be adhered to the polymer composite.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWING

For a more complete understanding of this disclosure and its features, reference is now made to the following description, taken in conjunction with the accompanying drawing, in which:

FIG. 1 depicts a stator forming a portion of a directional drilling assembly according to an embodiment of the present disclosure.

DETAILED DESCRIPTION

Embodiments of the present disclosure provide methods for improving adhesion or bonding between materials forming components of directional drilling assemblies. Such methods may provide for use of plasma treatment or coatings to enhance or improve the adhesion between the materials to be bonded, thereby reducing the degradation or mechanical failure of the components formed for use in oilfield applications.

Plasma is a term that generally may refer to an excited or ionized gas. Plasma treatment, therefore, generally may be considered the use of such an excited or ionized gas at low pressure or atmospheric pressure to affect a surface, such as to increase or decrease energy on that surface. Plasma treatment may be employed to clean and/or surface-treat various materials used in the fabrication of directional drilling assemblies according to embodiments of the present disclosure. Plasma may be applied to components forming a stator or rotor in a mud motor of a directional drilling assembly, for example, as plasma is generally considered to be environmentally friendly, generating little or no waste chemicals, and may be a safer fabrication technique. Further, plasma may be tuned to deliver surface-specific properties. Plasma also may be used to activate and/or treat temperature-specific surfaces according to embodiments of the present disclosure.

Plasma treatment may comprise a variety of functions related to fabricating components of directional drilling assemblies according to embodiments of the present disclosure. More specifically, plasma treatment may be used for etching a surface, to promote wettability of a surface, to increase surface activation, for cleaning, and/or for adhesion, such as by creation of mechanical locks. It should be appreciated that one or more of these functions may be performed on a surface to improve adhesion between components according to embodiments of the present disclosure. Each of these plasma treatment functions is described in further detail below.

Plasma etching may be employed to change the roughness of a surface to be bonded or adhered to another surface or material in a directional drilling assembly on a microscopic scale according to embodiments of the present disclosure. Etching may change the roughness of a surface by increasing the contact surface and the mechanical locking to promote adhesion. Etching also may have a role in removing contamination on a surface. For example, a surface of a component used in the fabrication of a rotor or stator in a mud motor of a directional drilling assembly may be etched using plasma, such as a reactive process gas. Particles present on such a surface may be sputtered off, converted to a gaseous phase, and then suctioned off using, for example, a vacuum system. This may increase the surface area of a material to be bonded to another to fabricate a component of a directional drilling assembly. Plasma etching in such a manner may make the surface of a material more easily wettable. Further, roughening one or more surfaces may enhance mechanical locking, for example, between the materials to be bonded or adhered together to fabricate a component of a directional drilling assembly according to embodiments of the present disclosure. Injecting plasma into a roughened surface of a stator, for example, may allow plasma to flow more easily into the etched portions of the roughened surface. The inclusion of plasma may improve adherence properties of a treated surface relative to a surface of another material to which the treated surface may be bonded or adhered to form a component of a directional drilling assembly.

Often complementary to plasma etching, forms of plasma treatment may be employed to promote the wettability of a surface within a directional drilling assembly, such as a surface of a component of a stator or rotor according to embodiments of the present disclosure. Wetting is generally the ability of a liquid to maintain contact with a solid surface, resulting from intermolecular interactions when the liquid and the solid surface are brought together. This may allow better contact or interaction between, for example, a surface of a resilient layer-lined cartridge to be adhered or bonded to a polymer composite to fabricate a stator or rotor in a directional drilling assembly according to embodiments of the present disclosure.

Plasma surface activation may be another form of plasma treatment employed according to embodiments of the present disclosure. In plasma surface activation, active oxygen species or radicals associated with plasma may bombard a surface to break up separating agents, silicones, and/or oils on a surface, and these particulates may be pumped away from the surface using a vacuum system, thereby cleaning the surface. Active oxygen species or radicals associated with plasma may bind to active surface sites on the material, creating a surface that may be more receptive to bonding or adhesion. Active oxygen species or radicals then may break up the bonds and/or cross bonding of the molecules on the surface may occur. The resultant oxidation may increase the polar groups associated with that surface.

Plasma surface activation, therefore, may remove surface layers with low molecular weights while oxidizing the uppermost atomic layer of the material. The increase in polarity due to plasma surface activation may improve the adhesion properties of the surface when placed in contact with another surface or a bonding agent for bonding or adhering purposes in directional drilling assemblies.

When a surface is activated by vacuum plasma, for example, the chemical interactions (such as polar interactions and/or covalent bonding) of the surface to be bonded may be strengthened. This may improve adhesion or bonding properties of the surface without changing the material properties of the activated surface. In an embodiment of the present disclosure, a surface of a resilient layer-lined cartridge forming a stator or rotor may be treated with ammonia, nitrogen and/or hydrogen gases to functionalize the surface through formation of amine chemical groups on the surface. By functionalizing the surface through plasma activation, the physicochemical interactions between that surface of the resilient layer-lined cartridge and another surface to which it may be bonded, such as a polymer composite, may be enhanced.

Plasma cleaning is another form of plasma treatment that may provide for surface preparation of components in a directional drilling assembly according to embodiments of the present disclosure. Plasma cleaning may remove impurities and contaminants from surfaces using energetic plasma created from gaseous species. Energetic species in plasma may bombard a surface to break most organic bonds of surface contaminants, and therefore, break apart oil and grease that may be present on the surface. Cleaning a surface with oxygen plasma, for example, may remove oils and grease on the surface at a nanoscale level and may reduce more contamination than traditional wet-cleaning methods. As a result of plasma cleaning, a clean surface may be provided that may be ready for bonding or further processing, without the generation of much, if any, harmful waste material.

Plasma cleaning may be a desirable form of surface preparation in directional drilling assemblies according to embodiments of the present disclosure because of the low toxicity of the gases employed. Further, plasma cleaning may be more precisely controllable with respect to power, pressure, gas type, and/or processing time as compared to other surface preparation methods. In addition, waste that may be generated during plasma cleaning may take a gaseous form that may be released directly into the atmosphere without unnecessarily detrimental environmental effects.

Ionizing a low-pressure gas using high frequency voltages may form plasma that may be used in cleaning according to embodiments of the present disclosure. However, it should be appreciated that atmospheric pressure plasma also may be used without departing from the present disclosure. Further, other mechanisms for formation of plasma may be used without departing from the present disclosure. In an embodiment of the present disclosure, energetic oxygen in plasma may react with surface contaminants to form water and carbon dioxide byproducts that may be pumped away from the chamber where the surface may be processed.

By plasma cleaning a surface to remove contamination such as plasticizers, anti-degradants, and vulcanization activator chemical complexes, adhesion between surfaces to be bonded, for example, to form a rotor or stator in a directional drilling assembly according to embodiments of the present disclosure, may be improved. Treatment with ammonia or hydrogen or nitrogen gases may functionalize the surface by forming amine chemical groups on the surface that may increase the physicochemical interactions. It should be appreciated that both metal and non-metal surfaces forming components of directional drilling assemblies may be plasma cleaned without departing from the present disclosure.

In conjunction with, or in addition to, the various plasma treatment functions previously described, plasma treatment may be employed to enhance adhesion between surfaces that may be bonded within a directional drilling assembly. According to embodiments of the present disclosure, adhesion may be promoted between the surfaces of a resilient layer-lined cartridge, a polymer composite, and/or metal stator tube or rotor core that may form components of a stator or rotor.

It should be appreciated that plasma treatment may be used to enhance adhesion between surfaces in a directional drilling assembly regardless of whether a bonding agent (such as glue) may also be employed in bonding according to embodiments of the present disclosure. It also should be appreciated that plasma treatment may be employed to further enhance the adhesion of a bonding agent to one or more surfaces to be bonded within a directional drilling assembly without departing from the present disclosure.

Therefore, according to embodiments of the present disclosure, metal or non-metal surfaces may be cleaned, roughened, and/or activated using plasma treatment. Such plasma treatment may improve the wettability of the surface(s), increase surface area, and/or improve the adhesion of one surface to another surface or a bonding agent to be employed in the fabrication of components in a directional drilling assembly.

FIG. 1 depicts a stator forming a portion of a directional drilling assembly according to an embodiment of the present disclosure. In an embodiment of the present disclosure, surface 101 of a resilient layer-lined cartridge may be plasma treated and adhered to polymer composite 102 to form a stator for use in a mud motor in a directional drilling assembly. It should be appreciated that a surface of a resilient layer-lined cartridge also may be plasma treated and adhered to a polymer composite in a rotor according to embodiments of the present disclosure. In the past, a resilient layer-lined cartridge utilized in the formation of stators or rotors, for example, has had a tendency to delaminate from a polymer composite when traditional bonding techniques were utilized to adhere a surface of a resilient layer-lined cartridge to a polymer composite. However, cleaning, etching, and/or activating the surface 101 through plasma treatment may result in enhanced interactions and improved adherence between surface 101 and polymer composite 102 according to embodiments of the present disclosure. Further, stator tube 103 may be adhered to composite 102 by plasma treating surface 104 according to embodiments of the present disclosure.

Atmospheric and/or vacuum plasma treatment may be used to perform any or all of the above-described functions in the fabrication of directional drilling assemblies according to embodiments of the present disclosure. In atmospheric plasma treatment, an electrically charged atmosphere may be created using gas atmospheres, such as nitrogen or ammonia, in place of air to introduce a wide range of surface modifications to a substrate. A surface may be prepared by breaking down surface decontamination, oxidizing the surface to be treated, finely etching the surface to create greater surface area, and/or depositing coatings on the surface according to embodiments of the present disclosure. Atmospheric plasma treatment may occur with a head scanning the surface of a material to be treated. A plasma torch also may be used. However, it should be appreciated that other mechanisms for applying atmospheric plasma may be used without departing from the present disclosure.

In contrast to atmospheric plasma treatment, vacuum plasma treatment may involve creation of stable and effective plasma by an electromagnetic discharge of gas at low pressure and low temperature. In vacuum plasma treatment, plasma may interact with the surface without changing the material properties of the surface. Vacuum plasma may be applied within a vessel or a vacuum chamber. However, as with atmospheric plasma, other mechanisms of applying vacuum plasma may be employed without departing from the present disclosure.

It should be appreciated that one or more gases may be used in methods of plasma treatment in fabricating a directional drilling assembly according to embodiments of the present disclosure. Gases of varying intensities may be similarly utilized. For example, a gas having a first intensity may be used for cleaning, a second gas (or the first gas having a different intensity) may be used for surface activation, and a third gas (or the first or second gas having a different intensity) may be used to etch the surface of a component. For example, less energy (or intensity) may be needed to plasma clean a surface than may be needed to plasma etch a surface. Accordingly, a different gas, or a less intense form of the same gas, may be used in plasma cleaning as compared to plasma etching. It should be appreciated that a gas, or different gases, of varying intensities may be applied using a plasma gun, for example, although other mechanisms for delivery of plasma to a surface may be utilized without departing from the present disclosure.

Plasma treatment may be applied to surfaces of the various materials that may form components of a directional drilling assembly according to embodiments of the present disclosure. For example, plasma treatment may be applied to a surface of a resilient layer-lined cartridge forming a portion of a stator or rotor. Plasma treatment also may be applied to a polymer composite material forming a stator or rotor. It also should be appreciated that plasma treatment may be used with respect to mud motors as well as progressive cavity pumps or hydraulic motors without departing from the present disclosure.

In an embodiment of the present disclosure, a stator may include a resilient layer-lined cartridge. Resilient layers according to embodiments of the present disclosure may include, but are not necessarily limited to, fluoroelastomers (such as VITON fluoroelastomers), hydrogenated nitrile rubber (HNBR), nitrile rubber (NBR), synthetic rubber, and/or natural rubber or combinations thereof. Such resilient layers may be fully cured, partially cured, or green or un-cured, when incorporated into a stator according to embodiments of the present disclosure. It also should be appreciated that such a cartridge may be formed from layers of different materials, and may even include a non-resilient layer. In other embodiments of the present disclosure, a cartridge may be formed having a resilient layer that may be fiber-reinforced or mesh-reinforced. In further embodiments of the present disclosure, the cartridge may be metallic (e.g., formed from steel, stainless steel, aluminum, titanium, or a combination thereof) and/or coated with metal (e.g., chrome, gold, silver, copper, cadmium, nickel, zinc, lead, tin or a combination thereof). A surface of a cartridge in a stator formed according to embodiments of the present disclosure may be subjected to plasma treatment to improve adhesion with respect to other surfaces within the stator and/or a bonding agent to which it may be bonded.

It also should be appreciated that various polymer-based composite materials may be used in forming a stator or rotor for use in a directional drilling assembly according to embodiments of the present disclosure. Such polymer-based composite materials may include, but are not necessarily limited to, epoxy resins, polyimides, polyether ether ketones (PEEK), polyketones, phenolic resins, and/or polyphenylene sulfides (PPS) or combinations thereof. Each of these polymer-based composite materials may be plasma treated according to embodiments of the present disclosure. For example, a polymer-based composite material may be adhered to a surface of a resilient layer-lined cartridge and/or to an internal surface of a stator tube through plasma treatment, with or without a bonding agent, such as glue, according to embodiments of the present disclosure.

In an embodiment of the present disclosure, to create a stator or rotor for use in a mud motor of a directional drilling assembly, a controlled thickness resilient layer may be formed and inserted within a longitudinal bore of a body. For example, a cast material, such as a metal-filled, inorganic-filled, and/or polymer fiber-filled polymer composite, may then be disposed in the void formed between the outer surface of the resilient layer and the longitudinal bore of the body. The cast material and the resilient layer may then be plasma treated such that the cast material is adhered to the resilient layer. Plasma may be applied to the outer surface of the resilient layer according to an embodiment of the present disclosure. Plasma may be applied to the cast material, or to both the cast material and the resilient layer, to promote adhesion. However, methods other than use of cast materials may be utilized according to embodiments of the present disclosure.

In another embodiment of the present disclosure, a resilient material may be injected into a void between a stator body and a mandrel. The stator body, which may be metal, may be plasma treated, and the mandrel may be removed forming an resilient material-lined stator. In another embodiment of the present disclosure, a resilient material may be extruded through a profile die. Plasma treatment may be used in forming components of directional drilling assemblies according to embodiments of the present disclosure to achieve improved bonding.

Embodiments of the present disclosure may provide coating an internal surface of resilient layer 101 (depicted in FIG. 1) following plasma treatment. Fluoro-based coatings, metal coatings, such as chrome plating, and/or hard coatings, including diamond-like carbon (DLC) coatings, depicted as coating 105 in FIG. 1, may be applied to protect resilient layer 101. Plasma coating in this manner may be used to minimize friction with respect to resilient layer 101 as well as to improve bonding between coating 105 and resilient layer 101, regardless of whether other plasma treatment may occur. In an embodiment of the present disclosure, a resilient layer of a power section of a stator may be treated with plasma and then coated with a fluro-based coating to protect the resilient layer. Such a treatment may improve the chemical resistance of the resilient layer as well as minimize friction between a rotor and a stator in bonding, thereby improving reliability and performance of the stator and/or rotor in operation of a directional drilling assembly according to embodiments of the present disclosure.

While several embodiments of the present disclosure have described plasma treatment with respect to certain types of stators, it should be appreciated that plasma treatment also may be employed with respect to more conventional stator technology. Further, it should be appreciated that plasma treatment as described herein may be employed in a similar with respect to rotors as well as stators in fabricating directional drilling assemblies according to embodiments of the present disclosure.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A method of adhering a first component of a directional drilling assembly to a second component, the method comprising the steps of:

plasma treating a surface of the first component to form a first plasma-treated surface, the first component being a resilient layer;

plasma treating a surface of the second component to form a second plasma-treated surface, the second component being a polymer-based composite material; and adhering the first plasma-treated surface to the second plasma-treated surface, wherein each said step of plasma treating comprises at least one of cleaning, etching and activating each said surface with at least one of an atmospheric plasma and a vacuum plasma, the atmospheric plasma and the vacuum plasma each comprising an excited gas or an ionized gas.

2. The method of claim 1, wherein the plasma-treated surfaces are further adhered with a bonding agent.

3. The method of claim 1, wherein the steps of plasma treating i-s are conducted with the atmospheric plasma.

4. The method of claim 1, wherein the steps of plasma treating are conducted with the vacuum plasma.

5. A method of forming a directional drilling assembly, the method comprising the steps of:

plasma treating a surface of resilient layer to form a first plasma-treated surface;

plasma treating an internal surface of a metal tube to form a second plasma-treated surface, wherein each said step of plasma treating comprises at least one of the step of cleaning, etching and activating with at least one of an atmospheric plasma and a vacuum plasma plasma treating inner and outer surfaces of a polymer based composite material; and adhering the first plasma-treated surface and the second plasma-treated surface to the polymer-based composite material.

6. The method of claim 5, wherein the first plasma-treated surface is coated to protect the resilient layer.

7. The method of claim 5, wherein the step of plasma treating to form the first plasma-treated surface comprises at least two of the following functions: cleaning the surface of the resilient layer with plasma; etching the surface of the resilient layer with plasma; and activating the surface of the resilient layer with plasma.

8. The method of claim 5, wherein the step of plasma treating to form the second plasma-treated surface comprises at least one of the following functions: cleaning the internal surface of the metal tube with plasma; etching the internal surface of the metal tube with plasma; and activating the internal surface of the metal tube with plasma.

9. The method of claim 5, wherein the resilient layer is selected from the group consisting of fluoroelastomer, hydrogenated nitrile rubber, nitrile rubber, synthetic rubber, and natural rubber.

10. The method of claim 5, wherein the polymer-based composite material is selected from the group consisting of epoxies, metal-filled epoxies, inorganic-filled epoxies, polymer fiber-filled epoxies, polyimides, polyether ether ketones, polyketones, phenolic resins, and polyphenylene sulfides.

11. A method of improving the bonding properties of components of a stator in a mud motor, the method comprising:

providing a mud motor having a stator formed as a resilient layer-lined cartridge;

adhering a surface of the resilient layer-lined cartridge to a polymer composite; and plasma treating the surface of the resilient layer-lined cartridge prior to adhering the surface of the resilient layer-lined cartridge to the polymer composite, wherein the step of plasma treating comprises the step of at least one of cleaning, etching and activating with at least one of an atmospheric plasma and a vacuum plasma, the atmospheric plasma and the vacuum plasma each comprising an excited gas or an ionized gas.

12. The method of claim 11, said method further comprising: plasma treating an internal surface of a stator tube to form a plasma-treated internal surface; and adhering the plasma-treated internal surface to the polymer composite.

* * * * *